March 8, 1938.  J. DICHTER  2,110,327
AUTOMATIC MACHINE FOR MANUFACTURING AMPULLAE FROM GLASS TUBES
Filed June 29, 1934  2 Sheets-Sheet 1
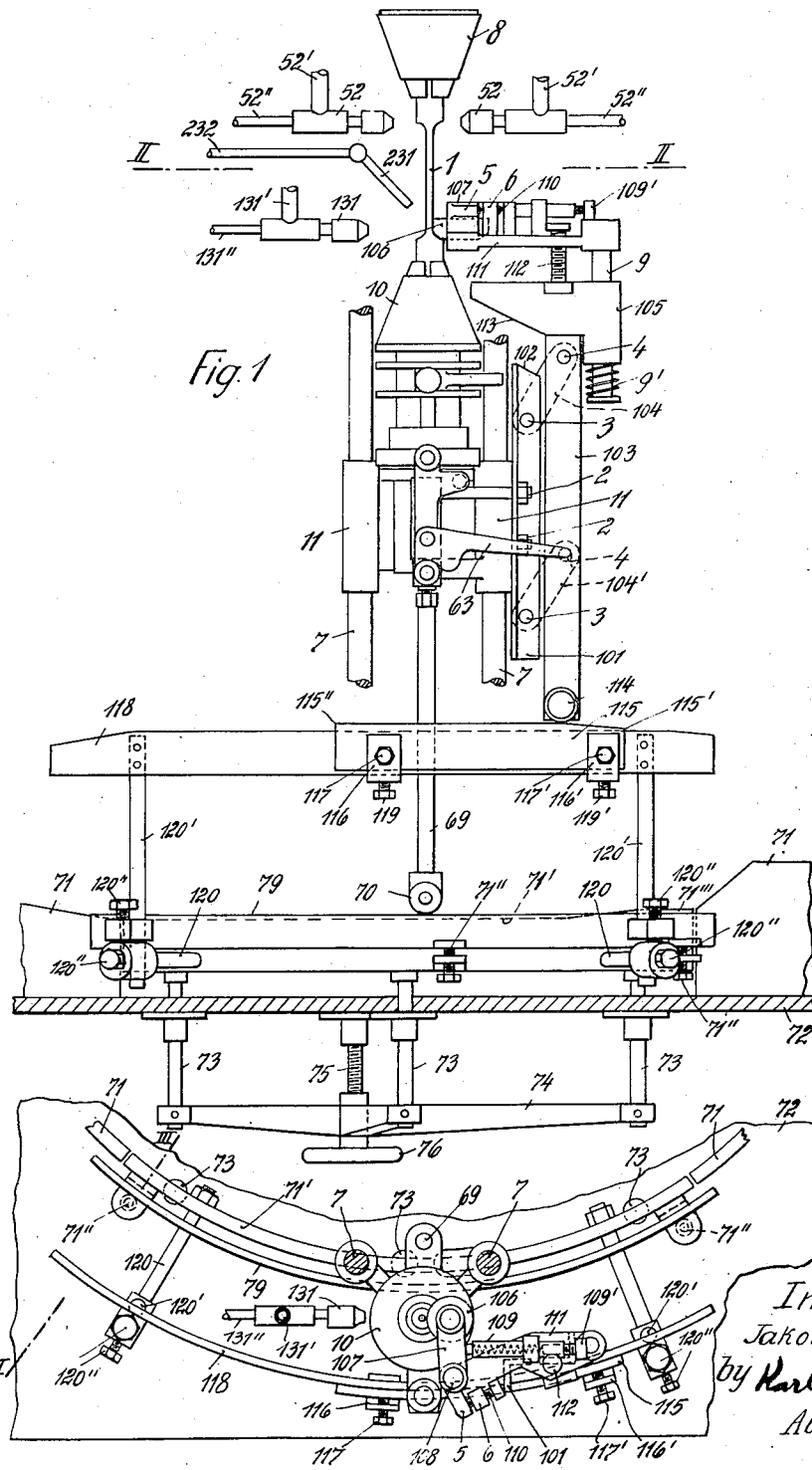
Inventor:
Jakob Dichter
by Karl Richards
Atty.

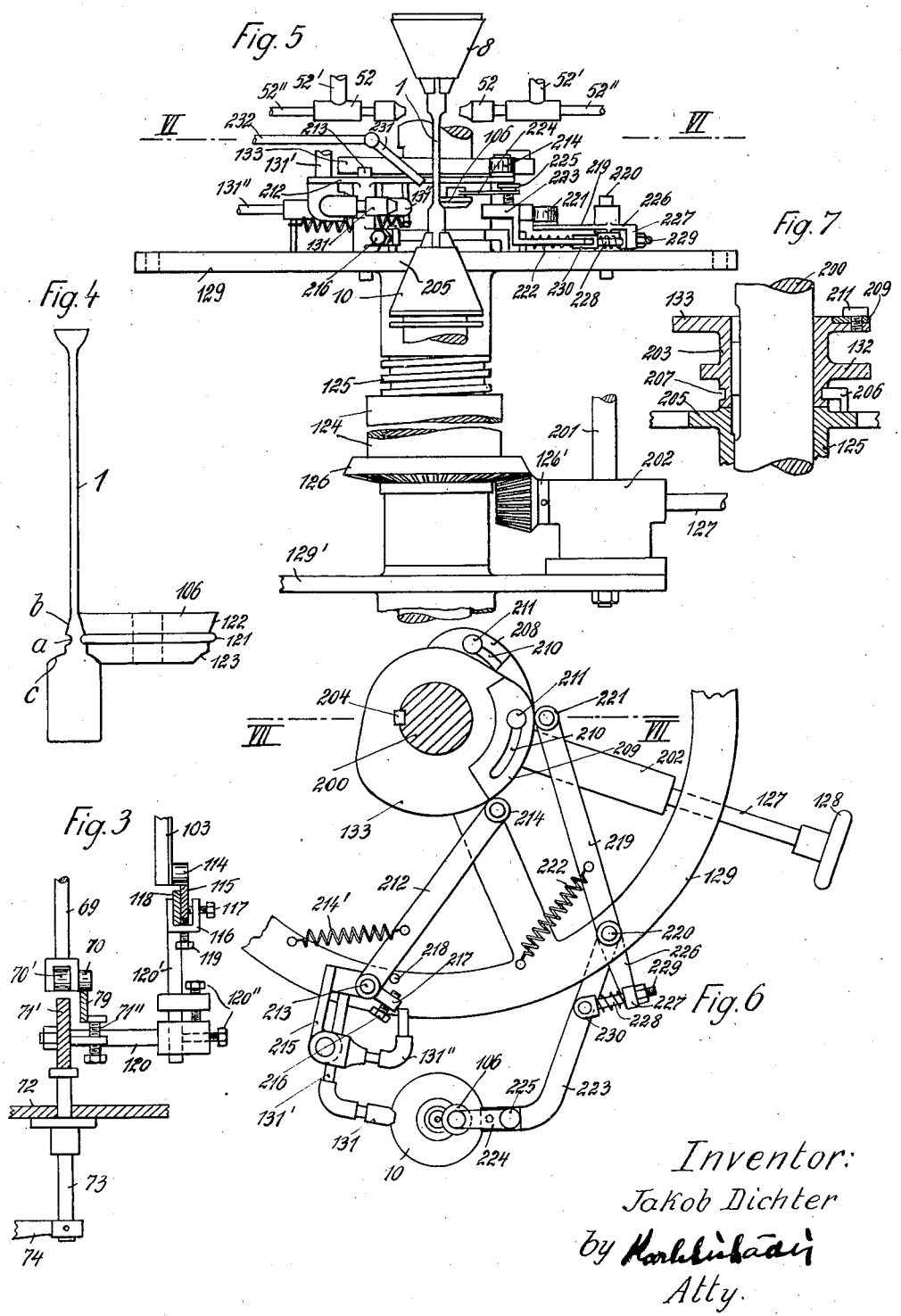

Patented Mar. 8, 1938

2,110,327

UNITED STATES PATENT OFFICE 2,110,327

AUTOMATIC MACHINE FOR MANUFACTURING AMPULLAE FROM GLASS TUBES

Jakob Dichter, Berlin-Schoneberg, Germany

Application June 29, 1934, Serial No. 733,100
In Germany June 30, 1933

18 Claims. (Cl. 49—7)

My invention relates to a machine for manufacturing ampullae from glass-tube stock. It is an object of my invention to provide certain improvements in a machine for the same purpose which is described in my Patent No. 1,962,985, dated June 12, 1934, for "Machine for the manufacture of ampullas and the like glass bodies". In this machine, ampullae are manufactured from glass-tube stock progressively, and the finished ampulla is detached from the stock while at the same time the bottom of the subsequent ampulla is formed on the stock. Before the ampulla is detached from the stock, it is constricted at one or two points by heating and upsetting the portion to be constricted. The depth of the constriction is determined by rolling on a molding rail or guiding rib, projecting into the path along which the ampulla moves, or the points of the ampullae are straightened and centered by the rail or rib. As the rail or rib is adjusted once and for all for all diameters of tubes, irregularities which are inevitable in the manufacture, are not considered sufficiently, and waste occurs by distortion at the molding point.

These drawbacks of the machine described in my said copending application are eliminated according to my invention by providing a molding tool which is moved toward and away from that portion of the ampulla which is to be molded, by positive means. The molding tool is preferably supported resiliently and is adapted to be adjusted vertically and laterally, so that the conditions of operation at every station are considered.

By the molding device described, constrictions are produced, or the depth of constrictions which have been produced by a burner is varied, the shoulders of the ampullae are molded, and their points are centered.

During the molding operation, the tool is preferably, in addition to its movement toward the ampulla, also shifted in parallel to the axis of the ampulla, so that the shoulder becomes rounded and no excessive thickening of the glass wall is produced. With the same object, the portion to be molded may be thinned by reheating it and drawing it out further after the point has been drawn, so as to prevent excessive thickening of the glass by the operation of the molding tool. The movement of the molding tool in the direction of the axis of the ampulla may also be replaced, or assisted, by a drawing-out movement of the ampulla.

Preferably, according to my invention, the molding tool is a roller with a flange whose radial size corresponds to the constriction to be produced, and with an extension, or extensions, at one side or at both sides of the flange, for molding the point and/or the shoulder of the ampulla. The extension, or extensions, is shaped in conformity with the shape of the point and/or shoulder and may be cylindrical or tapered.

A heating burner cooperates with the molding device and reheats the portion to be molded after the point has been drawn out, or means may be provided for cooling this portion after it has been molded. In order not to interfere with the free movement of the ampullae, and with the preceding operations, the burner is preferably moved toward, and away from, the molding point, for instance, by oscillating it.

The molding device may be used for producing initial tension at the molding point, as the comparatively cool molding tool is caused to contact with the hot glass of the ampulla. In order to regulate the temperature of the tool with respect to the temperature of the glass, I provide the heating burner referred to, and an air blower, which burner and blower alternately act on the molding tool, as required. The object of producing the initial tension is to provide a weak point where the glass will break, so that irregular breaking is prevented.

I may provide several movable units for rotation about a central column, as described in my said copending application, and move the units step by step. In a machine of this type, a single stationary molding device is sufficient. The units with the ampullae therein are moved step by step as far as the station where the molding device is positioned, and the molding tool is moved toward the molding point. In order to permit the tube to move on, the molding tool is returned into its initial position.

I may also provide a machine in which the units continuously rotate about an axis and in such a machine as many molding devices are provided as there are units. The molding devices preferably rotate with the units and the molding tools of the devices are moved into and out of active position for molding and for releasing the molded ampullae.

The same number of molding devices is provided if several units are arranged side by side and are stationary, or arranged in a circular line.

The operation of the machine is much simplified in a machine operating vertically and equipped with a fixed upper and a movable lower chuck per unit, as described in my said copending application, by mounting the molding device on the holder of the lower chuck, because with this arrangement the position of the molding device with respect to the chuck is not influenced if the drawing-out movement of the chuck is lengthened.

The molding device preferably moves along a track at the station, which is adapted to be adjusted vertically and horizontally, the latter for timing the molding device. Preferably, the track is secured to the adjustable insert by which the length of the point is determined so that the track is adjusted at the same time as the insert.

In a modification of my machine the molding devices are mounted together on a spider which spider is mounted to rotate about a central column with the units. Preferably, the movement of the molding tools toward and away from the molding points is effected by a single cam which is secured on the central shaft, but does not rotate with the spider. The spider, and preferably also the cam, are adjustable in vertical direction. The adjustment is facilitated by providing a hand wheel at the outer side of the machine, bevel gears and a threaded sleeve on the column.

In the drawings affixed to this specification and forming part thereof, a machine in which the operating units and a molding device on every unit rotate continuously about an axis and the units and molding devices are operated by fixed tracks at a station; and a machine in which the units and devices also rotate continuously about a shaft but are continuously operated by a cam; are illustrated diagrammatically by way of example.

In the drawings—

Fig. 1 is an elevation showing one of the units of the machine of the first type at the station where the tracks are, Fig. 2 is a section on the line II—II in Fig. 1, and Fig. 3 is a section on the line III—III in Fig. 2.

Fig. 4 shows an ampulla, and a tool for molding it.

Fig. 5 is an elevation showing part of the machine of the second type,

Fig. 6 is a section on the line VI—VI in Fig. 5, and

Fig. 7 is a section on the line VII—VII in Fig. 6.

Referring now to the drawings, and first to Figs. 1 to 3, it will appear that only certain parts of the machine are illustrated in these figures, as the complete machine has been fully described in my said patent. Only the table 72 has been illustrated in Figs. 1 to 3, and two of the slide bars 7 by which the two spiders of the machine are connected, but the spiders themselves, and the vertical central column about whose axis the units rotate with the spiders, have been omitted.

Every operating unit comprises a fixed upper chuck 8 which is supplied with glass-tube stock, and a movable lower chuck 10. The lower chuck is mounted on a holder which is equipped with a pair of sleeves 11 for sliding on the bars 7, and the chuck is equipped with a double-armed lever 63 for opening it.

Every unit is combined with a molding device, as will now be described. A bar 101, with a sloping upper end 102, is secured to the holder of the unit by screws 2. Links 104 and 104' are fulcrumed on the bar 101 at 3, 3 and the free ends of the links are pivoted to a driving rail 103 at 4. A support 105 is secured to the upper end of the driving rail 103, and is equipped with a sloping face 113 at its bottom for bearing on the sloping face 102 at the upper end of bar 101, in the inactive position of the molding device.

111 is a tool carrier which is attached to a rod 9 at one of its ends. The rod 9 is mounted to slide in the support 105 and is equipped with a spring 9' at its lower end which tends to pull the tool carrier 111 toward the upper face of the support 105, and with a threaded check 112 for limiting the movement of the carrier toward the support. The holder for the molding tool 106 is a double-armed lever fulcrumed on the tool carrier 111 at 108. The tool 106 is rotatably mounted on the free end of the longer arm 107 of this lever whose shorter arm 5 is held against an adjustable check 110 in a lug 6 on the tool carrier 111 by a spring buffer 109, Fig. 2, with a screw 109' for regulating the tension of the spring in the buffer.

71 is a circular track on the table 72 which at the station, or at every station, is interrupted for the reception of an insert 71' whose upper edge is below the upper edge of track 71 and is connected to the track by slopes at the inner ends of the circular track 71. 71'' are two pairs of lugs and screws at the insert 71' which support a curved outer track 79. The upper edge of the outer track 79 is straight and horizontal and the upper edge of the insert 71' is parallel to the upper edge of the outer track 79, but below the same, with the exception of an elevated portion 71''' at the right-hand end of the insert 71', for a purpose which will be explained below. A rod 69 is secured to the holder of every unit and is equipped with a pair of rollers 70 and 70' at its lower end. The outer roller 70 runs on the track 79, and the inner roller 70' runs on the insert 71', as shown in Fig. 3, or on the track 71. The holders, through their rods 69 and rollers 70, 70', bear on the tracks 71 and 79, and on the insert 71', by gravity. The units move toward the station from the right in Fig. 1, and their inner rollers 70' descend the slope of the track 71 at the right and the more gradual slope 71''' of the insert 71, until the rollers 70 run on the straight and horizontal upper edge of the inner track 79. In this manner, the points of the ampullae are drawn out. The drawing-out occurs abruptly while the roller 70' descends the slope at the right of insert 71', and more gradually while the roller 70' rides on the slope 71''' of the insert. After the roller 70 has begun to ride on the outer track 79, the ampullae are drawn no longer, as the upper edge of track 79 is straight and horizontal.

Obviously, means must be provided for considering various lengths of ampullae. Means such as three lifting rods 73 which extend through the table 72 and with their upper ends support the insert 71', a curved member 74 connecting the lower ends of rods 73, and a hand wheel 76 with a spindle 75, are provided for roughly adjusting the insert 71', while the final and finer adjustment of the outer rail 79 is effected by the lugs and screws 71''.

The driving rail 103 of every molding device is controlled by a circular camway 118. This camway is connected to the insert 71' by horizontal rods 120, vertical rods 120' and screws 120'' for connecting and adjusting the rods. A track 115 is arranged at the outer side of camway 118 and has a slope 115' at its right-hand end where the units come from, and an abrupt step 115'' at the other end. 116 and 116' are U-shaped brackets, and 117, 117' are clamping screws in the brackets, for securing the track 115 to the camway 118 in any desired position, and screws 119 and 119' in the respective brackets serve for adjusting the track 115 in vertical direction, as best seen in Fig. 3.

114 is a roller at the lower end of the driving rail 103 which roller is adapted to run on the camway 118 and on the track 115, and it will be understood that the operation of the driving rail 103, and, through it, of the molding tool 106, is timed by shifting the track 115 on the camway 118 by means of brackets 116, 116', and that the level to which the driving rail 103 is raised, is determined by adjusting the screws 119 and 119'.

131 is a burner which is arranged opposite the molding tool 106, for heating the portion to be molded, or for reheating it after the point has been drawn, 131' is its gas-supply pipe, and 131" is its air-supply pipe. An air blower 231, with a supply pipe 232, may be provided for cooling the portion after it has been molded, or for cooling the molding roller 106, for producing initial tension. In order not to interfere with the movement of the units, the burner 131 is preferably mounted to oscillate into and out of its active position with respect to the ampulla. 52 are two burners arranged below the upper chuck 8 with gas pipes 52' and air pipes 52", for detaching the finished ampulla from the stock in this chuck, and for forming the bottom of the subsequent ampulla on the stock, as described in my said patent.

Referring now to Fig. 4, the molding roller 106 may be equipped with a flange 121 for constricting the ampulla at a, and with an outwardly flaring portion 122 above the flange which forms the neck portion b to which the point is connected. The body of the ampulla is molded to a shoulder at c by a tapered portion 123 of the roller below the flange 121.

The operation of the machine illustrated in Figs. 1 to 3 is as follows: The operating units rotate continuously and clockwise, approaching the station where the tracks are, from the right in Fig. 1. The roller 70' at the lower end of rod 69 abruptly descends the slope of the track 71 toward the insert 71' and the point is drawn out during this descent. The point may then be reheated by burner 131 while the roller 70' descends the gentler slope 71''', and drawn out for a second time. The drawing-out is finished when the roller 70 rides on the straight and horizontal upper edge of track 79.

The support 105 of the molding device rests on the sloping face 102 of bar 101 with its own sloping face 113 by gravity, the links 104, 104' are substantially horizontal, and the molding tool 106 is remote from the ampulla 1. When the roller 114 at the lower end of driving rail 103 runs on the slope at the right of camway 118, the molding device is raised substantially into the position illustrated in Fig. 1, and the molding tool 106 moves nearer to the molding point of the ampulla. The tool while moving toward the molding point, is also raised, i. e., shifted in parallel to the axis of the ampulla. The final position of the molding tool 106 is reached when the roller 114 has ascended the slope 115' of rail 115. The molding operation is now performed while the ampulla is rotated, and after it has been completed, the roller 114 moves off the rail 115 at the step 115''. Upon further rotation, the roller 114 drops off the slope at the left-hand end of camway 118 and the molding device returns into its initial position in which the sloping face 113 of support 105 bears on the face 102 at the upper end of bar 101. The finished ampulla is detached by burners 52.

Molding may be performed immediately after the point has been drawn out, as described, or after the portion to be molded has been reheated by burner 131. It is also possible to first produce a constriction by drawing out, as is old in the art, and thereupon finishing the restriction by the molding roller 106.

Referring now to Figs. 5 to 7, the chucks 8 and 10 are provided as described, and the lower chuck 10 is operated for drawing out the point by means such as the tracks described with reference to Figs. 1 to 3 which have been omitted in Figs. 5 to 7. 200 is the central shaft or column about which an upper spider 129 and a lower spider 129' are rotated, and 201 is one of the stays by which the spiders are connected for rotation in unison. 125 is a hollow threaded spindle which is integral with, or connected to, the upper spider 129 and is free to rotate on the column 200, 124 is a sleeve with a female thread in which the spindle 125 is inserted, 126 is a bevel pinion at the lower end of the sleeve 124, and 126' is a bevel pinion on a shaft 127 which is mounted to rotate in a block 202 on the lower spider 129' and is equipped with a hand wheel 128 at its outer end. By these means the sleeve 124 is rotated and the distance between the lower spider 129' and the upper spider 129 is varied as required. The burners 52 for detaching the finished ampullae from the stock are provided as described but the heating burner 131 is pivotally mounted on the upper spider 129.

Two cams 132 and 133 are supported by a boss 203, Fig. 7, which is splined on the central column 200 at 204. The lower end of the boss bears on a flange 205 which projects from the upper face of the upper spider 129, and a hook 206 is secured to the spider and engages in a groove 207 in the boss 203 below the lower cam 132. Both cams are equipped with adjustable portions 208 for the lower, and 209 for the upper cam, with slots 210 and screws 211 with knurled handles for holding the adjustable portions on the respective cams.

The heating burner 131 is controlled by the upper cam 133. Its operating lever 212 is fulcrumed on the upper spider 129 at 213 and equipped with a roller 214 and a spring 214' for holding the roller 214 against the cam 133. 131' is the gas pipe, and 131" is the air pipe, of burner 131. The burner is connected to its lever 212 by a bracket 215, and 216 is a set screw in a lug 217 on the boss of lever 212 which cooperates with a check 218 on the upper spider 129.

A lever 219 fulcrumed at 220 on the upper spider 129 and equipped with a roller 221 at its free end, cooperates with the upper cam 133 to which its roller 221 is held by a spring 222. Fulcrumed at the same point is a divided lever whose parts 223 and 224 are connected by a screw 225 and whose part 224 supports the molding roller 106 at its free end. The boss of the lever 219 is equipped with an extension 226 and a downwardly extending lug 227 at the end of the extension. The lug bears against a spring 228 on a pin 229 whose forked inner end 230 is pivoted to the part 223 of the divided lever.

The cams 132 and 133, being splined on the column 200, move with the spiders 129 and 129' and therefore are always in the proper position with respect to the levers 212 and 219. The levers themselves rotate about the cams with the spiders and the burner 131 and the molding roller 106 are operated while they rotate. The operation may be timed by displacing the adjustable cam portions 208 and 209.

Instead of moving the cams along the column 200 with the spiders, as described, I might provide cams which are fixed on the column, and elongate the rollers 214 and 221 so as to make up for the movement of the spiders in parallel to the axis of the column.

I wish it to be understood that I do not desire to be limited to the exact details of construction shown and described for obvious modifications will occur to a person skilled in the art.

I claim:—

1. In a machine for manufacturing ampullae from glass tube stock, means for heating the ampulla, means for drawing out its point, a molding tool movable with said drawing means, means for moving said tool toward, and away from, the portion of the ampulla which is to be molded and for shifting said tool in parallel to the axis of the ampulla, and means for detaching the finished ampulla from the stock.

2. In a machine for manufacturing ampullae from glass tube stock, means for heating the ampulla, means for drawing out its point, a molding tool movable with said drawing means, means for moving said tool toward, and away from, the portion of the ampulla which is to be molded and for shifting said tool in parallel to the axis of the ampulla, resilient means interposed between said tool and the means for moving and shifting it, and means for detaching the finished ampulla from the stock.

3. In a machine for manufacturing ampullae from glass tube stock, means for heating the ampulla, means for drawing out its point, a molding tool, means for moving said tool toward, and away from, the portion of the ampulla which is to be molded, means for so cooling said tool as to produce an initial tension in the ampulla at a predetermined point, and means for detaching the finished ampulla from the stock.

4. In a machine for manufacturing ampullae from glass tube stock, means for heating the ampulla, means for for drawing out its point, a molding tool, means for moving said tool toward, and away from, the portion of the ampulla which is to be molded, means for producing initial tension in the said portion, and means for detaching the finished ampulla from the stock.

5. In a machine for manufacturing ampullae from glass tube stock, means for heating the ampulla, means for for drawing out its point, a molding tool, means for moving said tool toward, and away from, the portion of the ampulla which is to be molded, an air blower for cooperation with said heating means, for producing initial tension in the said portion, and means for detaching the finished ampulla from the stock.

6. In a machine for manufacturing amullae from glass tube stock, means for heating the ampulla, means for drawing out its point, a molding tool, means for moving said tool toward, and away from, the portion of the ampulla which is to be molded, an air blower for cooperation with said heating means, for producing initial tension in the said portion, while the molding tool moves toward the ampulla, and means for detaching the finished ampulla from the stock.

7. In a machine for manufacturing ampullae from glass tube stock, means for heating the ampulla, means for drawing out its point, a molding tool, means for moving said tool toward, and away from, the portion of the ampulla which is to be molded, means for regulating the relative temperature of the molding tool and the ampulla for producing initial tension in the said portion, and means for detaching the finished ampula from the stock.

8. In a machine for manufacturing ampullae from glass tube stock, a plurality of operating units, means on every unit for drawing out the points of the ampullae, a molding device combined with every unit, a molding tool on said device, means for moving said units past a station, and means at said station for: heating the ampullae, operating the means for drawing out the points, for operating said molding device, and for detaching the finished ampullae from the stock.

9. In a machine for manufacturing ampullae from glass tube stock, a plurality of operating units, means on every unit for drawing out the points of the ampullae, a molding device combined with every unit, a molding tool on said device, means for moving said units past a station, and means at said station for: heating the ampullae, operating the means for drawing out the points, for operating said molding device, for detaching the finished ampullae from the stock, and means for regulating and timing the operation of the individual means at said station.

10. In a machine for manufacturing ampullae from glass tube stock, a plurality of operating units, means on every unit for drawing out the points of the ampullae, a molding device supported by said drawing-out means, a molding tool on said device, means for moving said units past a station, and means at said station for: heating the ampullae, operating the means for drawing out the points, and for detaching the finished ampullae from the stock; and a camway at said station for operating said molding device.

11. In a machine for manufacturing ampullae from glass tube stock, a plurality of operating units, means on every unit for drawing out the points of the ampullae, a molding device supported by said drawing-out means, a molding tool on said device, means for moving said units past a station, and means at said station for: heating the ampullae, operating the means for drawing out the points; and for detaching the finished ampullae from the stock; a camway at said station for operating said molding device, a track on said camway, and means for adjusting said track vertically and laterally with respect to said camway.

12. In a machine for manufacturing ampullae from glass tube stock, a plurality of operating units, means on every unit for drawing out the points of the ampullae, a molding device combined with every unit, a molding tool on said device, means for moving said units past a station, and means at said station for: heating the ampullae, operating said molding device, and detaching the finished ampullae from the stock; a track at said station for operating the means for drawing out the points, means for adjusting said track, a camway at said station for operating said molding device, which camway is attached to said track, a track on said camway, and means for adjusting said last-mentioned track vertically and laterally with respect to said camway.

13. In a machine for manufacturing ampullae from glass tube stock, a plurality of operating units, means on every unit for drawing out the points of the ampullae, a molding device combined with every unit, a molding tool on said device, means for moving said units, a stationary column said units rotate about, a cam held against rotation on said column for operating said molding device, means for heating the ampullae, and means for detaching the finished ampullae from the stock.

14. In a machine for manufacturing ampullae from glass tube stock, a plurality of operating units, means on every unit for drawing out the points of the ampullae, a molding device combined with every unit, a molding tool on said device, means for moving said units, a stationary column said units rotate about, a cam held against rotation with respect to, but free to move along said column with said units, for operating said molding device, means for heating the ampullae, and means for detaching the finished ampullae from the stock.

15. In a machine for manufacturing ampullae from glass tube stock, a plurality of operating units, means on every unit for drawing out the points of the ampullae, a molding device combined with every unit, a molding tool on said device, means for heating the ampullae, means for operating the means for drawing out the points, and means for detaching the finished ampullae from the stock.

16. In a machine of the class described, a pair of gripping devices for gripping a length of tubing, means for heating a portion of the length of tubing between said gripping devices, means providing for relative movement of said gripping devices away from each other to reduce the cross sectional area of the heated portion of the length of tubing, a molding tool carried by one of said gripping devices and movable with the same upon relative movement of the gripping devices, and means for moving said molding tool into engagement with the portion of the length of glass tubing to be molded.

17. In a machine of the class described, means for supporting a length of glass tubing, means for heating a portion of the length of tubing, means for shaping the heated portion of the length of tubing, and means for directing a cooling fluid against a part of the heated portion of the length of tubing to produce an initial tension in the said portion.

18. In a machine of the class described, means for supporting a length of glass tubing, means for shaping said length of glass tubing to form an ampulla, and means for creating an initial tension in the ampulla at a predetermined point.

JAKOB DICHTER.